United States Patent [19]

Frazier et al.

[11] Patent Number: 4,879,479
[45] Date of Patent: Nov. 7, 1989

[54] POLY-YNE NONLINEAR OPTICAL MATERIALS

[75] Inventors: Claude C. Frazier, Ellicott City; Shekhar Guha, Columbia; Wenpeng Chen, Bethesda, all of Md.

[73] Assignee: Martin Marietta Corporation, Bethesda, Md.

[21] Appl. No.: 81,785

[22] Filed: Aug. 5, 1987

[51] Int. Cl.[4] .............................................. G02F 1/35
[52] U.S. Cl. ................................ 307/425; 350/96.12; 350/96.29; 350/96.34
[58] Field of Search ................ 350/96.12, 96.13, 96.14, 350/96.15, 96.29, 96.34; 307/425–430

[56] References Cited

U.S. PATENT DOCUMENTS

| | | | |
|---|---|---|---|
| 4,431,263 | 2/1984 | Garito | 350/96.34 |
| 4,536,450 | 8/1985 | Garito | 428/411.1 |
| 4,767,826 | 8/1988 | Liang et al. | 525/421 |

OTHER PUBLICATIONS

K. Sonogashira et al, "Syntheses and Properties of . . . Complexes of Platinum(II)", *J. of Organometallic Chem.*, 145 (1978), pp. 101–108.
Frazier et al, "Third-Order Optical Non-Linearity in Metal-Containing Organic Polymers," *Polymer*, vol. 28, Apr. 1987, pp. 553–555.
J. Zyss, *Journal of Non-Crystalline Solids*, 47, p. 211 (1982).
S. Takahashi, Y. Takai, H. Morimoto, and K. Sonogashira, *Journal of the Chemical Society Chemical Communications*, 3 (1984).
S. Takahashi, H. Morimoto, E. Murata, S. Kataoka, K. Sonogashira and N. Hagihara, *Journal of Polymer Science, Polymer Chemistry Edition*, 20, p. 565 (1982).
*Journal of Physical Chemistry*, 90, p. 5703 (1986).
P. P. Bey, J. F. Giuliani and H. Rabin, *IEEE Journal of Quantum Electronics*, QE-4, p. 932 (1968).
J. P. Hermann, *Optics Communications*, 12, p. 102 (1974).
M. J. Soileau, W. W. Williams and E. W. Van Stryland, *IEEE Journal of Quantum Electronics*, QE-19, p. 731 (1983).

*Primary Examiner*—John D. Lee
*Attorney, Agent, or Firm*—Herbert W. Mylius; Gay Chin

[57] ABSTRACT

The present invention relates to a device for optical switching, frequency conversion, and protection of sensory organs and optical and electronic sensors which comprises at least one layer comprising a polymerized transition metal poly-yne.

43 Claims, 5 Drawing Sheets

EXPERIMENTAL ARRANGEMENT

POLY-YNE NONLINEAR OPTICAL MATERIALS

This invention relates to devices for sensor protection, frequency conversion, and optical switching using organic polymeric materials. More particularly, the invention pertains to devices in a variety of forms including, but not limited to, pure thin films, polymer mixtures, lyotropic liquid crystals, solutions and suspensions, which convert the frequency, switch, or limit the power incident on a sensor to a level below that which damages the sensor.

BACKGROUND OF THE INVENTION

As is well known in the field of optics, high power laser beams, while useful for many purposes, are potentially dangerous to surrounding instrumentations as well as to the sensory organs of the technicians using them. Accordingly, there has been a long felt need for protective means to guarantee safety to such instruments and operators.

Nonlinear optical materials have been proposed for such protective means but to date have proven to be inadequate for most applications for a number of reasons including low magnitude nonlinearity, low damage threshold, and environmental instability.

Substantial second- and third-order nonlinear optical effects have been demonstrated for organic molecules, crystals, powders and polymers in recent years. Delocalized electrons on the organic compounds are the basis for the large nonlinear effects exhibited by these materials. These electrons are sensitive to external stimulation and can transfer their response over long distances within molecules. Other features in organic molecules also play a part in determining their nonlinear response. According to J. Zyss in *Journal of Non-Crystalline Solids*, 47, p. 211 (1982), these structural requirements may be outlined as follows.

Conjugation. In organic molecules, the presence of a highly delocalized -electron system considerably increases the optical nonlinearity of these molecules compared with related nonconjugated compounds, e.g., in an aromatic ring, or as developed by the resonant alternation of single and multiple chemical bonds in polyacetylenes or polydiacetylenes.

Presence of charge transfer. Substitution of an electron-attracting group, such as $-NO_2$, and an electron-donating group, such as $-N(CH_3)_2$, at two electronically interacting sites of the same molecule increases molecular nonlinearity.

Lack of centrosymmetry. The absence of a center of inversion symmetry is essential for the manifestation of even harmonics generation in crystals. Generally, chemists have found that acentricity in a crystal can best be ensured by including chirality in the individual molecules. The property of chirality enables a compound to exist as a pair of nonsuperimposable mirror images (enantiomers). A pure enantiomer will crystallize with an acentric unit cell and, accordingly, has the potential for second-harmonic generation and other $\chi^2$ effects.

To date, purely organic polymeric compounds have received almost all of the emphasis in the search for macromolecular systems with large third-order susceptibilities. U.S. Pat. Nos. 4,431,263 and 4,536,450, issued to Garito, for example, disclose nonlinear optical materials which are based on polymers formed from diacetylenic species.

SUMMARY OF THE INVENTION

It has now been discovered that polymers of transition metal poly-ynes and monomeric units related to the repeating units of these polymers are nonlinear optical materials which are superior to prior art nonlinear materials, particularly as regards the magnitude of optical nonlinearity and the degree of visible transparency, and can be used to construct a wide range of protective devices for sensors and switching elements and frequency converters for optical computing and optical communications. These polymers may be used in a variety of forms, both pure and mixed with other polymeric materials, and may perform a variety of secondary operations including, but not limited to, phase conjugation, optical bistability, optical switching, harmonic generation, parametric mixing and oscillation, and signal processing.

DESCRIPTION OF THE PREFERRED EMBODIMENTS

Figure 1:
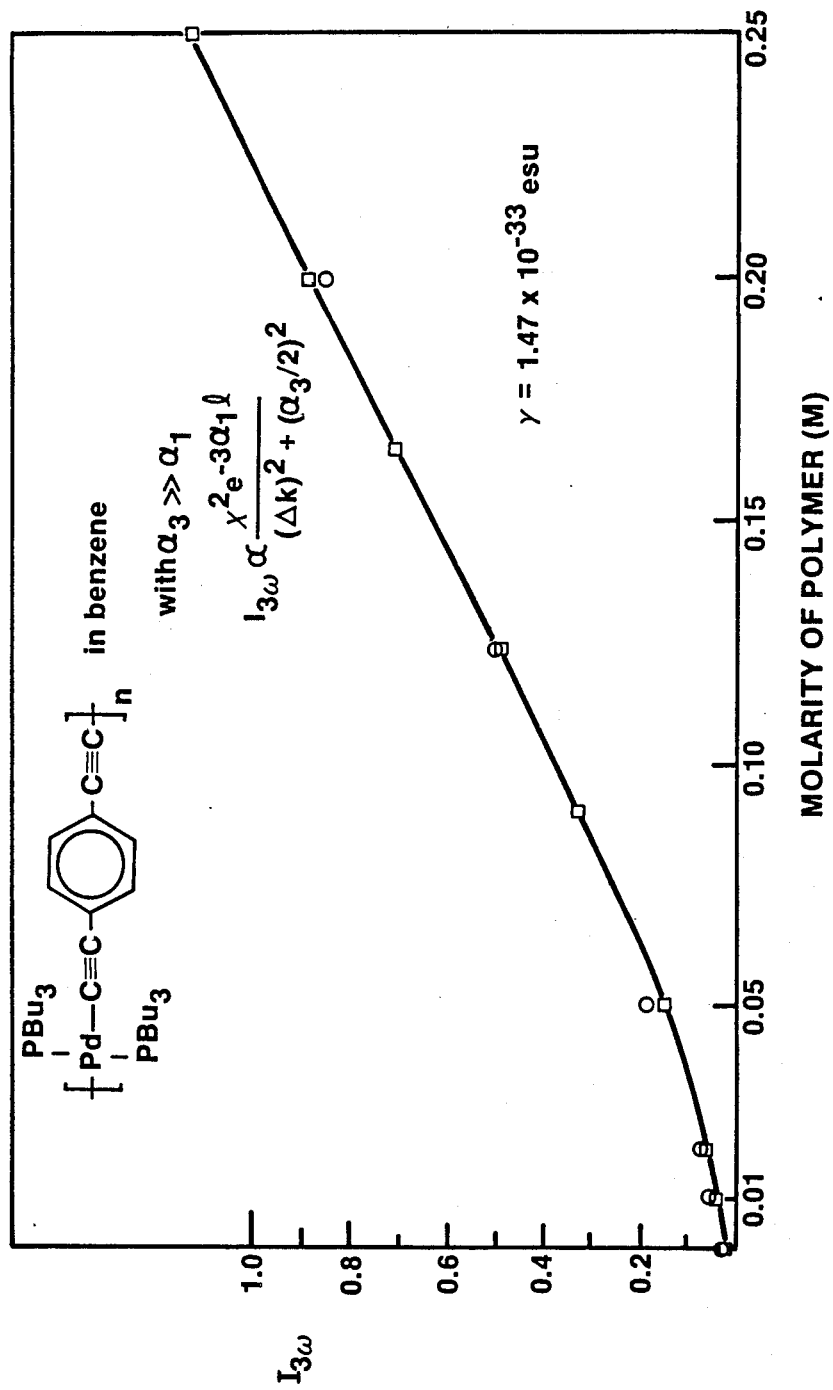

Polymerized transition metal poly-ynes, according to this invention, are organometallic polymers having one, or both, of the following repeating units:

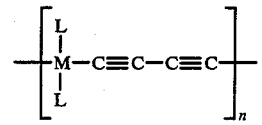

and

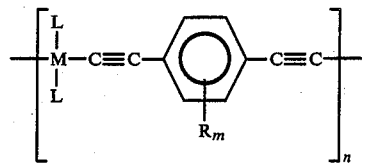

wherein M is a transition metal such as palladium, platinum or nickel; L is a ligand such as, for example, $-P(C_4H_9)_3$ (hereafter expressed $-PBu_3$); R is an organic substituent such as methyl or ethyl (hereafter expressed as $-Me$ and $-Et$, respectively); m is a whole number from 0 to 4, inclusive; and n is a whole number which may range from 1, for the monomer unit, to over 200 for the larger polymers.

The transition metal does not disrupt the conjugation in the above polymer systems but actively participates by mixing or interacting d-orbitals with the conjugated $\pi$-electron orbitals of the organic moiety of the repeating unit. This provides an extended, delocalized electronic system within the polymer chain. Furthermore, the polymer systems have low-energy metal-to-ligand charge transfer transitions which are not found in pure organic polymer systems. These transitions are associated with significant reordering of the $\pi$-electron distribution and have been found to lead to the manifestation of large third-order optical nonlinearities, both as lyotropic solutions and as cast films.

The synthesis of the transition metal poly-yne polymers, as well as the ability of these materials to form lyotropic liquid crystals and the relationships between the structure and magnetic anistropy of the polymers, has been reported extensively by N. Hagihara, S. Takahashi, K. Sonogashira and their co-workers (See S.

Takahashi, Y. Takai, H. Morimoto and K. Sonogashira, *Journal of the Chemical Society Chemical Communications*, 3 (1984) and the papers and publications cited therein).

The following polymers have been prepared and all will demonstrate nonlinear optical properties:

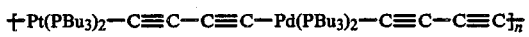

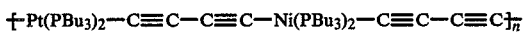

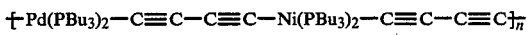

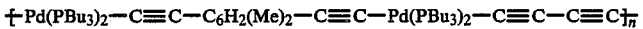

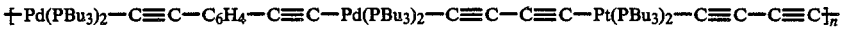

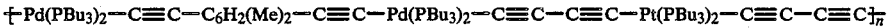

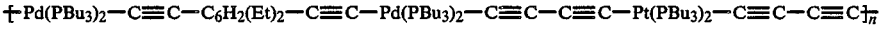

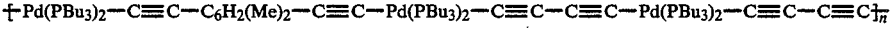

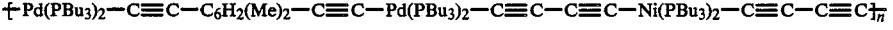

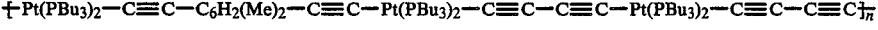

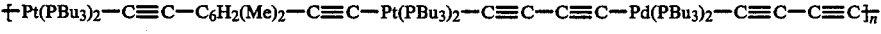

Other possible structural variations for the transition metal poly-yne polymers are expected to demonstrate nonlinear optical properties. For example, substitution of the butyl groups of the tributyl phosphine ligands in the above polymers with other alkyl groups modifies the solubility and the electronic energy levels within the polymers. Additionally, the metal or combination of metals used in the polymer chain influences the energy levels, solubility, and strength of the metal-carbon bonds, thereby influencing thermal stability. Moreover, a manipulation of the alkyl side groups in those polymers containing a benzene ring in the repeating unit produces minor perturbations in the physical properties of the polymers, but has been found to be a useful technique for fine-tuning polymeric structures to a desired combination of solubility, stability, and optical characteristics.

In addition to structural combinations which produce maximal third-order nonlinearity, the relationship between-$\chi^{(3)}$ and the length of the polymeric chain for a given repeating unit or units is important. Polymers having the same repeating unit(s), but different chain lengths, have different magnitudes of $\chi^{(3)}$. Chain length also affects film forming capability, polymer compatibility in polymer mixtures, and solubility. Therefore, many polymer systems have optimal average molecular weights giving high nonlinearity and ease of fabrication for devices according to this invention.

A palladium poly-yne,

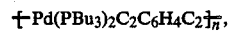

is prepared according to the procedure outlined by S. Takahashi, H. Morimoto, E. Murata, S. Kataoka, K. Sonogashira and N. Hagihara in *Journal of Polymer Science, Polymer Chemistry Edition*, 20, p. 565 (1982). A polymer fraction having an average molecular weight of 32,000 amu, as determined by calibrated high-pressure liquid chromatography, is used to prepare solutions and cast films for third harmonic generation and power-limiting experiments. The palladium poly-yne film used in power limiting experiments is formed from a solution of the palladium polymer and Upjohn polyimide 2080D in 1-methyl-2-pyrrolidone. The solution is spread on a glass plate using a doctor blade, and the solvent is removed from the resulting thin film by placing the plate in a vacuum oven at room temperature for a period of up to twenty-four hours. Dry, free-standing films having thicknesses of 25 to 120 $\mu$m are obtained by this technique.

Third harmonic measurements are obtained using a mode-locked Nd:YAG laser with a pulse train of 10 pulses of 125ps duration each. The experimental arrangement involves a reference and sample chamber similar to the second harmonic experimentation reported in *Journal of Physical Chemistry*, 90, p. 5703 (1986).

The following expression has been derived to represent the intensity of third harmonic radiation generated in an isotropic nonlinear medium (See P. P. Bey, J. F. Giuliani and H. Rabin, *IEEE Journal of Quantum Electronics*, QE-4, P. 932 (1968):

$$I_{3\omega} \propto \frac{\chi^{(3)}[e^{-3\alpha_1 l} + e^{-\alpha_3 l} - 2e^{-\frac{1}{2}(3\alpha_1+\alpha_3)l}\cos(\Delta k)l]}{(\Delta k)^2 + [\frac{1}{2}(\alpha_3 - 3\alpha_1)]^2}$$

where $\alpha_1$ = linear absorption coefficient at the fundamental frequency;

$\alpha_3$ = linear absorption coefficient at the third harmonic frequency;

l = cell length;

$\chi^{(3)}$ = non-vanishing component of the fourth rank electric susceptibility tensor; and $\Delta k = k_3 - 3k_1$, the real part of the wavenumber mismatch.

When $\alpha_3 > \alpha_1$, which is the case here, the above expression reduces to $$I_{3\omega} \propto \frac{\chi^{(3)2}e^{-(3\alpha_1 l)}}{(\Delta k)^2 + (\alpha_3/2)^2}$$

The third-order susceptibility, $\chi^{(3)}$, is obtained from the relationship $$\chi^{(3)} = L^4[N_o(\alpha_o) + N(\alpha)]$$

where

L = Lorentz local field factor; $N_o$ = concentration of solvent molecules; $\alpha_o$ = hyperpolarizability of solvent molecules; N = concentration of the solute (polymer repeating unit); and $\alpha$ = hyperpolarizability of solute (polymer repeating unit).

A hyperpolarizability value of $1.47 \times 10^{-33}$ esu has been obtained for the palladium polymer,

in benzene according to the same treatment which has been used to drive the hyperpolarizabilities and phase-matching characteristics of a series of cyanine dyes [See J. P. Hermann, *Optics Communications*, 12, p. 102 (1974)]. FIG. 1 shows the experimental points and calculated values using this hyperpolarizability value. The solid line is a guide for the eye and connects the calculated points. The good fit between the experimental and calculated values (with constant refractive indexes) strongly suggests that within the examined concentration range and for this solvent, phase-matching is not significant and can be ignored in these calculations.

The hyperpolarizability value obtained for the above poly-yne is not a nonresonant parameter since the generated third harmonic (355 nm) is near $\lambda_{max}$ (344 nm) of the metal-ligand charge transfer of the metal-poly-yne. Degenerate four wave mixing experiments have been performed in order to measure the nonresonant susceptibility of the palladium poly-yne,

, in tetrahydrofuran solution. Two laser beams, with wavelengths of 689.5nm and 659 nm, have been combined in a solution of the palladium poly-yne to generate a new beam at 634.5nm, according to the relationship $2W_1 - W_2 = W_3$, where the W's represent the wave numbers of the respective laser beams. From the mixing experiments, a nonresonant hyperpolarizability of $4 \times 10^{-34}$ esu/r.u. was determined for

The platinum analog,

was found to be even more nonlinear, having a nonresonant hyperpolarizability of $1.3 \times 10^{-33}$ esu/r.u.

Data from the mixing experiments have also demonstrated the large nonlinearities of some monomeric units with only one or two metal centers. Tetrahydrofuran solutions of $ClPt(PBu_3)_2$-C≡C-$C_6H_4$-C≡C-$Pt(Bu_3)_2Cl$ and $C_6H_5$-C≡C-$Pd(Bu_3)_2$-C≡C-$C_6H_5$ gave hyperpolarizability values of $3.1 \times 10^{-34}$ esu/molecule and $1.1 \times 10^{-34}$ esu/molecule, respectively.

Figure 2:
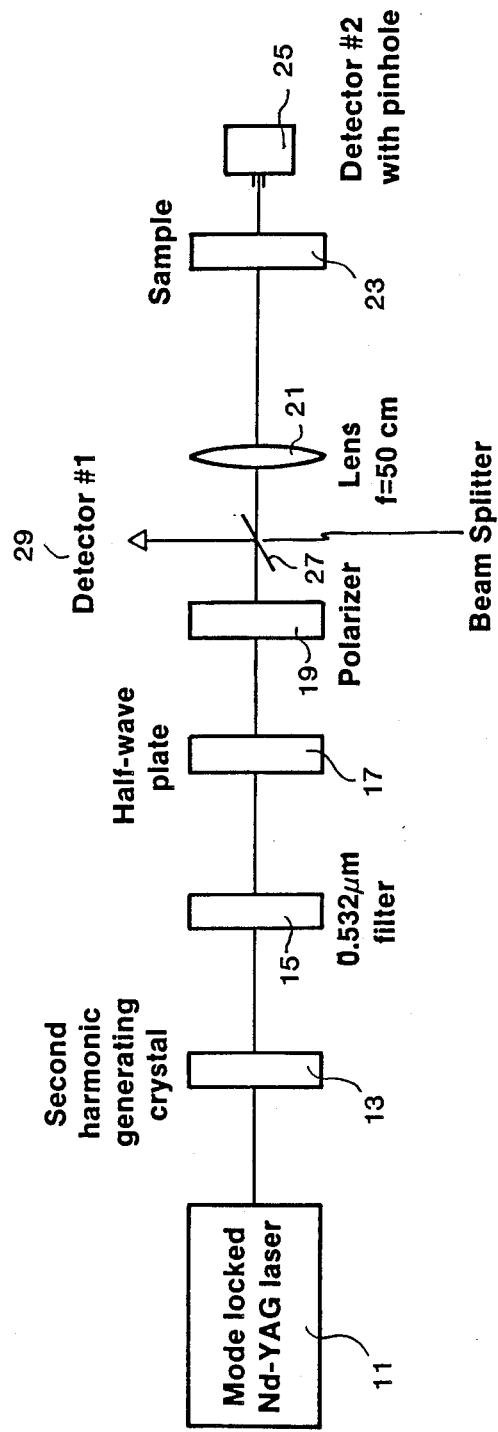

Power limiting experiments were conducted which employed the experimental arrangement shown in FIG. 2. Single pulses of 1.06$\mu$m radiation obtained from a passively mode-locked Nd:YAG laser 11 operating at 1 Hz are first frequency doubled by passage through a second harmonic generating crystal 13. The resulting 0.532$\mu$m radiation (pulse width 90 ps) is next passed through filter 15 and then a variable attenuator consisting of a halfwave-plate 17 and polarizer 19 combination. The maximum energy available at 0.532$\mu$m is approximately 1 mJ. The beam is focused by a 50 cm focal length lens 21 to a spot size of 117$\mu$m radius (half-width at $e^{-1}$ of maximum). A sample film 23 is placed at the focus and detector 25, having a pinhole of 25$\mu$m diameter, is placed 1 cm away from sample 23 to measure the transmitted fluence. As shown, part of the incident beam is deflected by a microscope slide 27 used as a beam splitter. The energy of this beam, measured by detector 29, is used to monitor the amount of energy incident on sample 23. Detectors 25 and 29 are calibrated pyroelectric detectors available from Laser Precision under the designation RjP735.

Figure 3:
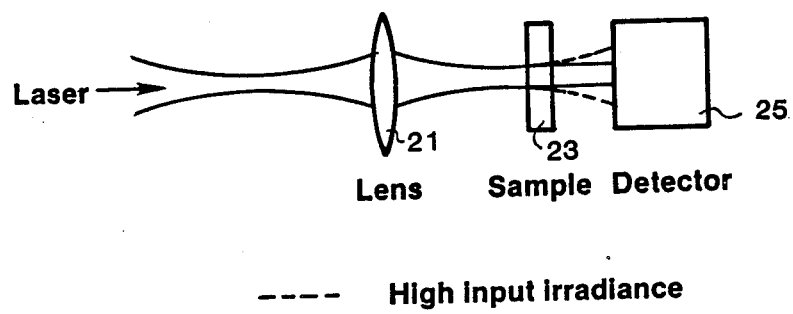

The power limiting method described in M. J. Soileau, W. W. Williams and E. W. Van Stryland, *IEEE Journal of Quantum Electronics*, QE-19, p. 731 (1983) may be employed to estimate the non-linear refractive index, $n_2$, of polymeric films made according to the present invention. FIG. 3 illustrates a simplified explanation of the technique. For a range of low incident energies on a sample, the energy transmitted through the sample increases linearly with increasing incident energy. For non-linear samples, the transmitted energy begins to level off above a specific incident energy and becomes independent of the incident energy, thus power limiting. The basis for this behavior lies in the response of non-linear materials to high-intensity Gaussian beams. Under such conditions, the nonlinear medium acts, depending on the sign of $n_2$, either as a diverging (as shown in FIG. 3) or converging lens.

Figure 4:
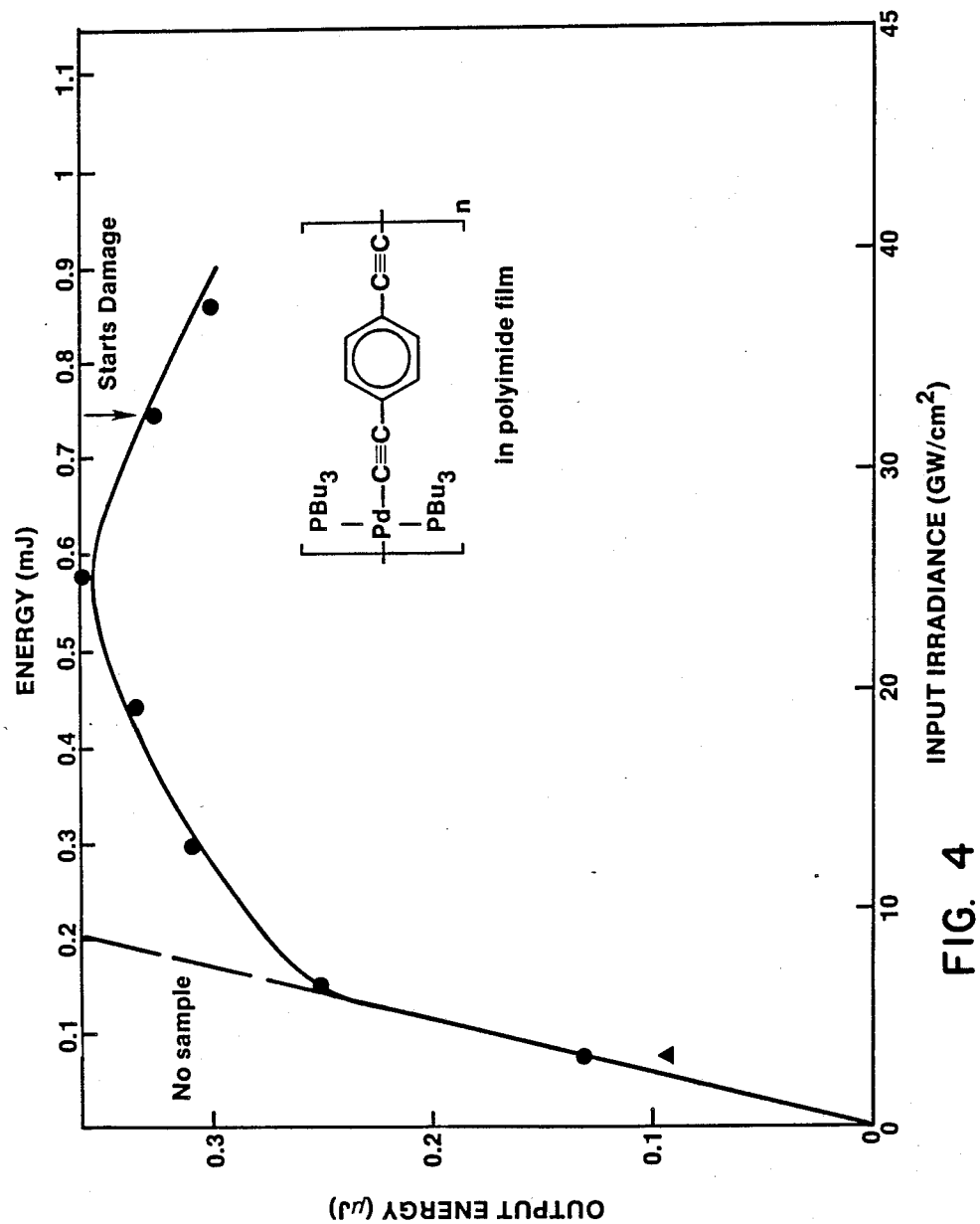

For low incident energies on the palladium-poly-yne film ($\sim$0.2 M Pd-polymer repeating unit), the readings at detector 25 increased with those at detector 29, as shown in FIG. 4. At incident energies of about 200$\mu$J, the film's non-linearity is expressed, and the reading at detector 25 becomes approximately independent of the incident energy. At an energy of $\sim$0.75 mJ (irradiance of 33 GW/cm$^2$), the film starts to become damaged, i.e., the surface blackens and the film fails to return to the original high transmission state at low irradiance.

Figure 5:
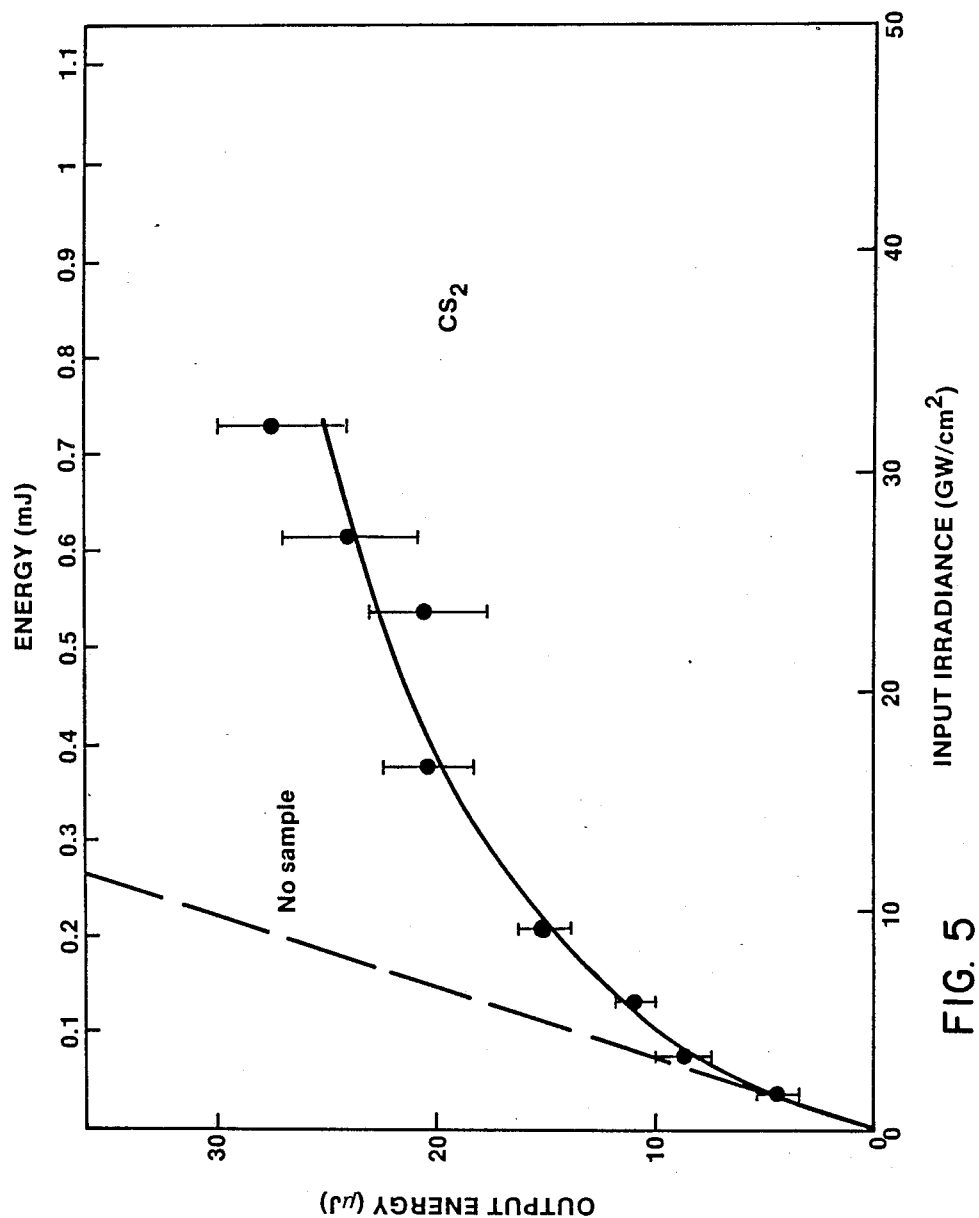

To assign an $n_2$ value to the palladium-poly-yne film, the experiment is repeated replacing the polymer film with a 1 cm cuvette of carbon disulfide, a well-studied non-linear optical material. As shown in FIG. 5, power limiting similar to that seen with the film is observed beginning at ~140μJ. Assuming that external self-action is the mechanistic origin of the power limiting (two-photon or other non-linear absorptive phenomena, while unlikely, cannot be totally excluded at this time), the limiting power is approximately inversely proportional to the irradiance-dependent phase change ($\Delta\phi$) that the laser beam experiences in traversing the non-linear medium. $\Delta\phi$ in turn is proportional to the product of $n_2$ and sample thickness. Thus, for a palladium-poly-yne-polyimide film thickness of 120μm, an $n_2$ value of $140/200 \times 1$ cm/0.0120 cm is approximately 58 times that of carbon disulfide.

It is to be understood that the above description of the present invention is susceptible to various modifications, changes, and adaptations by those skilled in the art, and that the same are to be considered to be within the spirit and scope of the invention as set forth by the claims which follow.

What is claimed is:

1. A device for optical switching, frequency conversion, and protection of sensory organs and optical and electronic sensors which comprises at least one layer comprising a polymerized transition metal poly-yne interposed in the path of a laser light so as to have a nonlinear optical effect thereupon.

2. The device of claim 1 wherein said polymerized poly-yne has at least one of the following repeating units:

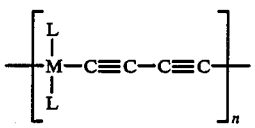

and

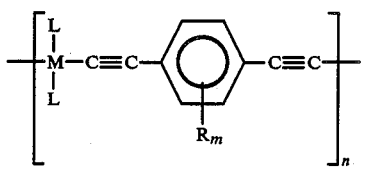

wherein M is a transition metal; L is a ligand; R is an organic substituent; m is a whole number from 0 to 4, inclusive; and n is a whole number from 1 to about 200.

3. The device of claim 2 wherein said transition metal is palladium, platinum, nickel, or a combination of two of the same.

4. The device of claim 2 wherein said ligand is a tributyl phosphine group of the formula: $-P(C_4H_9)_3$.

5. The device of claim 1 wherein said poly-yne comprises repeating units of the formula:

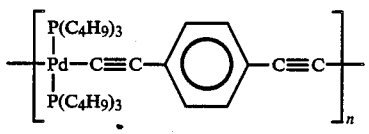

6. The device of claim 5 wherein said poly-yne has an average molecular weight of 32,000 amu.

7. The device of claim 1 wherein said layer consists essentially of said polymerized transition metal poly-yne blended with a dissimilar polymer.

8. The device of claim 7 wherein said dissimilar polymer is a polyimide.

9. The device of claim 1 wherein said layer consists essentially of a mixture of a polyimide polymer and a polymerized transition metal poly-yne of the formula:

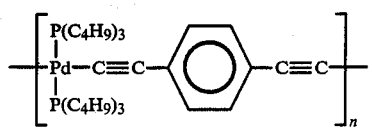

10. The device of claim 1 wherein said layer is in the form of a dry, free-standing cast film.

11. The device of claim 10 wherein said cast film has a thickness of 25 to 120μm.

12. The device of claim 1 wherein said layer is in the form of a film uniformly spread on a glass plate.

13. The device of claim 1 wherein said layer is in the form of a film uniformly spread on a transparent organic plastic plate.

14. The device of claim 1, wherein said layer is in the form of a solution of said polymerized transition metal poly-yne.

15. A device for optical switching, frequency conversion, and protection of sensory organs and optical and electronic sensors which comprises a dry, free-standing cast film of a power-limiting, polymerized transition metal poly-yne having repeating units of the formula:

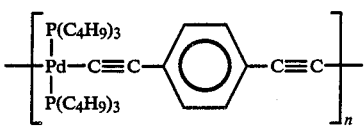

interposed in the path of a laser light so as to have a nonlinear optical effect thereupon.

16. The device of claim 15 wherein said poly-yne has an average molecular weight of 32,000 amu.

17. The device of claim 15 wherein said cast film has a thickness of 25 to 120μm.

18. The device of claim 15 wherein said cast film consists essentially of said poly-yne blended with a dissimilar polymer.

19. The device of claim 18 wherein said dissimilar polymer is a polyimide.

20. The device of claim 15 wherein said cast film consists essentially of a mixture of a polyimide polymer with said polymerized poly-yne.

21. A device for optical switching, frequency conversion, and protection of sensory organs and sensors from high power laser beams comprising at least one power-limiting organic polymeric layer which comprises an organometallic polymer having at least one of the following repeating units:

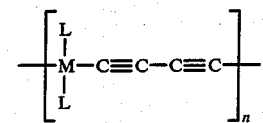

and

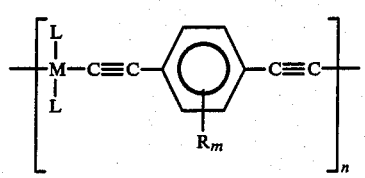

wherein M is a transition metal; L is a ligand; R is an organic substituent; m is a whole number from 0 to 4, inclusive; and n is a whole number from 1 to about 200, interposed in the path of a laser light so as to have a nonlinear optical effect thereupon.

22. The device of claim 21 wherein said transition metal is palladium, platinum, nickel, or a combination of two of the same.

23. The device of claim 21 wherein said ligand is a tributyl phosphine group of the formula: $-P(C_4H_9)_3$.

24. The device of claim 21 wherein said polymer comprises repeating unit of the formula:

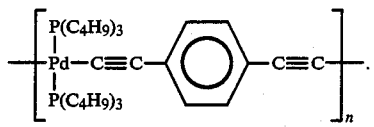

25. The device of claim 24 wherein said polymer has an average molecular weight of 32,000 amu.

26. The device of claim 24 wherein said layer consists essentially of said organometallic polymer blended with a dissimilar polymer.

27. The device of claim 26 wherein said dissimilar polymer is a polyimide.

28. The device of claim 24 wherein said layer consists essentially of a mixture of a polyimide polymer and an organo-metallic polymer of the formula:

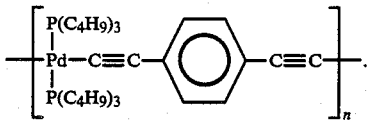

29. The device of claim 28 wherein said layer is in the form of a dry, free-standing cast film.

30. The device of claim 29 wherein said cast film has a thickness of 25 to 120μm.

31. The device of claim 24 wherein said layer is in the form of a dry, free-standing cast film.

32. The device of claim 31 wherein said cast film has a thickness of 25 to 120μm.

33. The device of claim 24 wherein said layer is in the form of a film uniformly spread on a glass plate.

34. The device of claim 24 wherein said layer is in the form of a film uniformly spread on a plastic plate.

35. The device of claim 21 wherein said layer is in the form of a solution of said organometallic polymer.

36. A method of optical switching, frequency conversion, and power limiting of a high power laser beam which comprises interposing in the path of said laser beam at least one layer comprising a polymerized transition metal poly-yne.

37. The method of claim 36 wherein said polymerized poly-yne has at least one of the following repeating units:

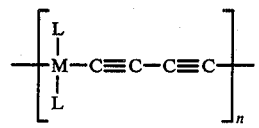

and

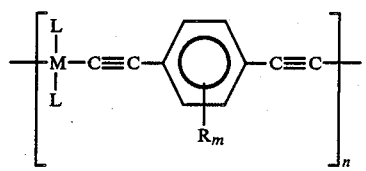

wherein M is palladium, platinum or nickel; L is a ligand; R is an organic substituent; m is a whole number from 0 to 4, inclusive; and n is a whole number from 1 to about 200.

38. The method of claim 36 wherein said poly-yne comprises repeating units of the formula:

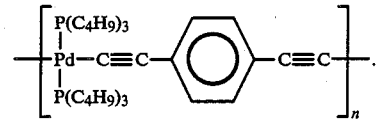

39. The method of claim 38 wherein said poly-yne has an average molecular weight of 32,000 amu.

40. The method of claim 36 wherein said layer consists essentially of a mixture of a polyimide polymer and a polymerized transition metal poly-yne of the formula:

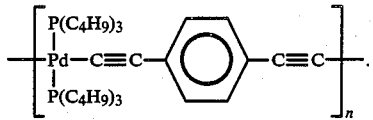

41. The method of claim 36 wherein said layer is in the form of a dry, free-standing cast film.

42. The method of claim 41 wherein said cast film has a thickness of 25 to 120μm.

43. The method of claim 36 wherein said layer is in the form of a solution of said polymerized transition metal poly-yne.

* * * * *